US010264721B2

(12) United States Patent
Serrurier (10) Patent No.: US 10,264,721 B2
(45) Date of Patent: Apr. 23, 2019

(54) AGRICULTURAL IMPLEMENT WITH BOLTLESS TINES

(71) Applicant: CNH Industrial America LLC, New Holland, PA (US)

(72) Inventor: Douglas C. Serrurier, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 136 days.

(21) Appl. No.: 15/402,734

(22) Filed: Jan. 10, 2017

(65) Prior Publication Data

US 2018/0192570 A1 Jul. 12, 2018

(51) Int. Cl.
*A01B 23/02* (2006.01)
*A01B 23/04* (2006.01)

(52) U.S. Cl.
CPC ............ *A01B 23/02* (2013.01); *A01B 23/043* (2013.01)

(58) Field of Classification Search
CPC ........ A01B 23/02; A01B 23/043; A01B 19/02
See application file for complete search history.

(56) References Cited

U.S. PATENT DOCUMENTS

| 839,249 A | * | 12/1906 | Wright | .................. | A01B 19/02 |
| | | | | | 172/693 |
| 1,345,209 A | | 6/1920 | Martin | | |
| 1,905,671 A | | 4/1933 | Aitkenhead | | |
| 2,855,836 A | | 10/1958 | Sutherland | | |
| 3,049,184 A | * | 8/1962 | Lohrman | ............... | A01B 19/02 |
| | | | | | 172/643 |
| 4,213,506 A | | 7/1980 | Hake | | |
| 4,304,306 A | * | 12/1981 | Maust, Jr. | .............. | A01B 23/02 |
| | | | | | 172/142 |
| 4,415,042 A | | 11/1983 | Cosson | | |
| 4,423,787 A | * | 1/1984 | Steinberg | ............... | A01B 35/24 |
| | | | | | 172/142 |
| 4,589,497 A | * | 5/1986 | Kovar | .................... | A01B 23/02 |
| | | | | | 172/643 |
| 5,027,907 A | * | 7/1991 | Delyea | .................... | A01B 19/02 |
| | | | | | 172/707 |
| 5,465,796 A | | 11/1995 | Buescher et al. | | |
| 5,487,429 A | * | 1/1996 | Gates | ..................... | A01B 19/04 |
| | | | | | 172/173 |
| 5,662,173 A | | 9/1997 | Blesing | | |
| 6,626,246 B2 | * | 9/2003 | Gerber | ................... | A01B 19/02 |
| | | | | | 172/142 |
| 7,070,007 B2 | | 7/2006 | Poutre et al. | | |
| 2002/0144827 A1 | * | 10/2002 | Dietrich, Jr. | ......... | A01B 49/027 |
| | | | | | 172/142 |
| 2006/0005978 A1 | | 1/2006 | Zaun et al. | | |
| 2010/0294524 A1 | | 11/2010 | Lawrenson | | |

FOREIGN PATENT DOCUMENTS

DE 1 407 718 10/1968

* cited by examiner

*Primary Examiner* — Matthew D. Troutman
(74) *Attorney, Agent, or Firm* — Rebecca L. Henkel; Rickard K. DeMille (57) ABSTRACT

An agricultural implement includes: a chassis; a hitch connected to the chassis; and a harrow carried by the chassis. The harrow includes: a tine frame having at least one clamp tab; and at least one tine clamped to the tine frame by the at least one clamp tab, the at least one tine including a clamped portion with a pair of opposite ends and a pair of vertically descending teeth, each of the vertically descending teeth being connected to a respective end of the clamped portion.

17 Claims, 8 Drawing Sheets

AGRICULTURAL IMPLEMENT WITH BOLTLESS TINES

BACKGROUND OF THE INVENTION

1. Field of the Invention

The present invention relates to agricultural implements, and, more particularly, to tillage implements with harrows having tines.

2. Description of the Related Art

A wide variety of tillage implements are used to prepare soil for planting. Some such implements include two or more sections articulated to one another so as to perform multiple functions as they are pulled through fields by a single tractor or other prime mover. One such implement is a cultivator/harrow, which is capable of simultaneously tilling soil and leveling the tilled soil in preparation for planting. This implement includes a cultivator that is towed by a tractor or other prime mover, and a unitary or sectional tine harrow that is towed by the cultivator.

The cultivator includes a plurality of cultivator members or "sweeps" (sometimes known as shanks or chisel plows) that are suspended from a frame and that rip into the soil as the machine is pulled across the ground to till the soil. The sweeps are arranged in transversely extending rows. The sweeps of each row are transversely staggered relative to the sweeps of the adjacent rows. In use, each successive row of sweeps tills part of a strip of soil left untilled by the preceding row. The last row of sweeps tills the last untilled strip of the swath, leaving ridges between the sweeps that are flanked by valleys directly behind the sweeps.

The harrow is designed to level the tilled soil sufficiently to produce a seedbed that is as level as possible and that is relatively clod free. A clod free, level seedbed formed from soil of relatively small particle size is desirable because it facilitates planting to a uniform depth and, accordingly, promotes uniform germination and uniform emergence. The typical harrow includes a plurality of ground-engaging tines that penetrate the soil tilled by the cultivator. Multiple harrow sections are often provided, each of which spans a proportionate part of the transverse width of the swath tilled by cultivator. The tines are typically arranged in longitudinally extending, transversely spaced rows. They are intended to redirect soil from ridges or windrows left by the cultivator sweeps into the adjacent valleys, hence leveling the tilled surface. The tines, and/or related equipment such as rotating baskets, also firm the soil and break up clods.

A typical cultivator can carry a large number of tines which are usually removable to allow for broken tines to be replaced. Known tines can be attached to the frame by, for example, bolting the tines to the frame. Bolting the tines to the frame tends to be a time consuming process and is labor intensive, especially when tines must be unbolted from the frame prior to bolting the new tines to the frame.

What is needed in the art is a relatively fast method of attaching tines to a harrow.

SUMMARY OF THE INVENTION

The present invention provides a harrow with a tine frame including one or more clamp tabs which clamp a tine to the tine frame.

The invention in one form is directed to an agricultural implement including: a chassis; a hitch connected to the chassis; and a harrow carried by the chassis. The harrow includes: a tine frame having at least one clamp tab; and at least one tine clamped to the tine frame by the at least one clamp tab, the at least one tine including a clamped portion with a pair of opposite ends and a pair of vertically descending teeth, each of the vertically descending teeth being connected to a respective end of the clamped portion.

The invention in another form is directed to an agricultural implement including: a chassis; a hitch connected to the chassis; and a harrow carried by the chassis. The harrow includes: a tine frame having a first surface with at least one clamp tab and a second surface angled with respect to the first surface; and at least one tine clamped to the first surface and the second surface by the at least one clamp tab, the at least one tine including a clamped portion and at least one vertically descending tooth connected to the clamped portion.

An advantage of the present invention is the tine(s) can be quickly and easily attached to and removed from the tine frame by the clamp tab(s).

Another advantage is pairing the teeth to a single clamped portion reduces the number of tines that must be attached to the tine frame to effectively work the soil.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
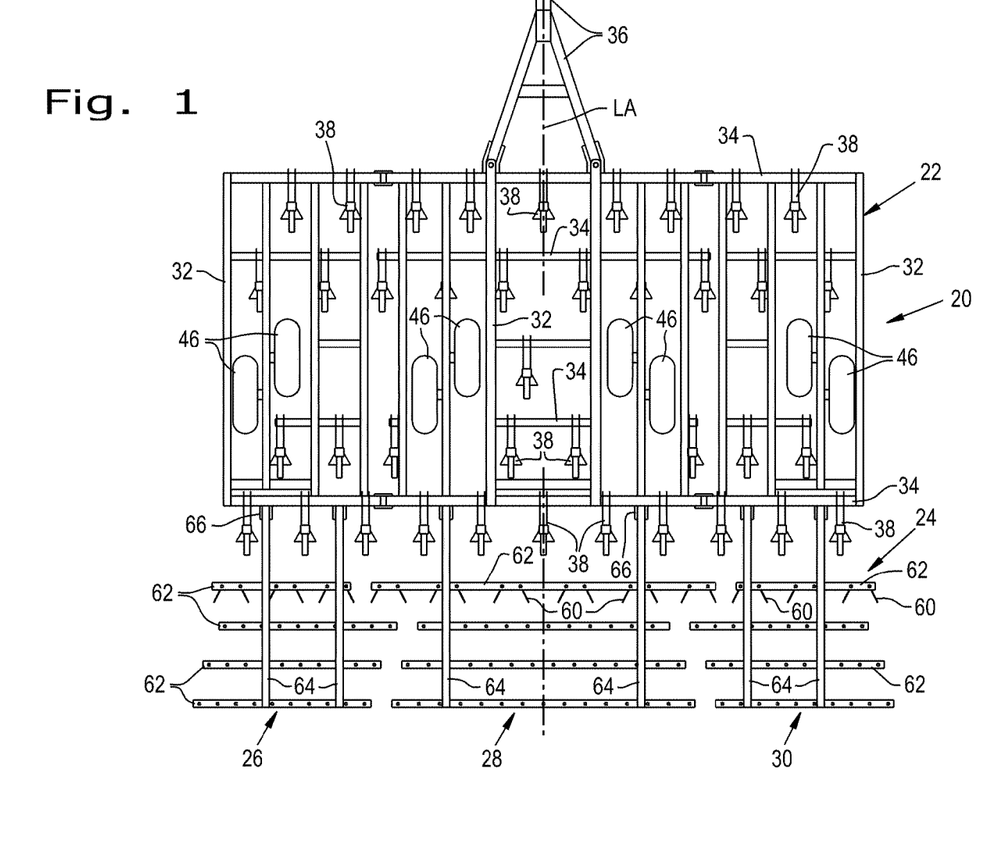
FIG. 1 is a top view of an embodiment of an agricultural implement formed according to the present invention.
Figure 2:
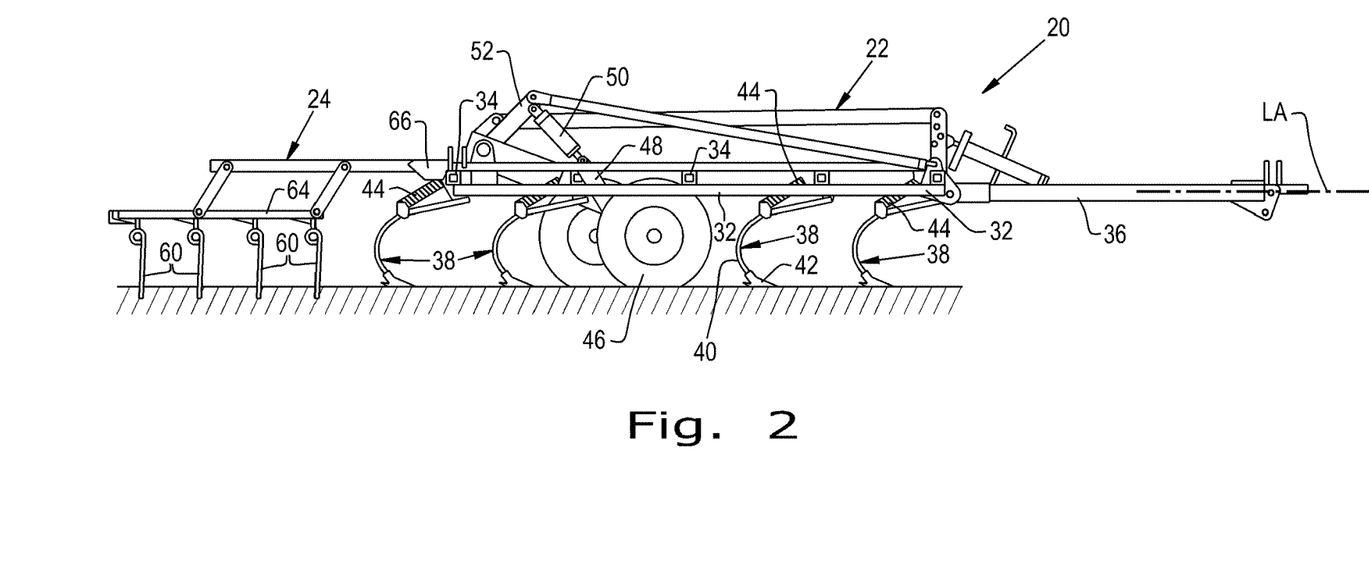
FIG. 2 is a side view of the agricultural implement shown in FIG. 1.

Referring now to the drawings, and more particularly to FIGS. 1-2, there is shown an embodiment of an agricultural implement 20 formed according to the present invention which includes a cultivator 22 and a tine harrow 24 articulated to one another in an end-to-end fashion. The cultivator 22 is configured to be towed by a tractor or other prime mover so as to till the soil over which the implement 20 travels. The harrow 24 is towed by the cultivator 22 and is configured to level windrows or ridges left by the cultivator 22. The harrow 24 can be formed to have a plurality (3 in the illustrated embodiment) of harrow sections 26, 28, 30 independently articulated to the back of the cultivator 22. The center harrow section 28 of the illustrated embodiment is wider than the two flanking end sections 26 and 30. However, different numbers of harrow sections of different relative widths, or even a single harrow section spanning the width of the swath tilled by the cultivator 22, can be provided if desired.

The cultivator 22 includes a chassis formed from longitudinal tubular beams 32 and transverse tubular beams 34, a hitch 36 that couples the chassis to a prime mover (not shown) and defines a longitudinal axis LA, and a plurality of cultivator members in the form of shank assembly 38 or plows that extend downwardly from the transverse beams 34 to the ground. As best seen in FIG. 2, each shank assembly 38 can include a curved arm 40 mounted on the associated transverse beam 34 and a sweep 42 mounted on the bottom end of the arm 40. The arms 40 can be pivotally mounted on the transverse beams 34 and be biased to the rearward-most positions thereof by springs 44. A plurality of wheels 46 can be mounted on arms 48 that are pivotable with respect to the frame. The arms 48 can be coupled to a hydraulic cylinder 50 by a suitable linkage 52 that raises and lowers the arms 48 upon cylinder extension and retraction. The wheels 46 therefore can be raised from their illustrated, lowermost position to either 1) a partially raised position to reduce the penetration depth of the shank assembly 38 or 2) a fully raised position for transport.

The shank assembly 38 of successive rows of the illustrated cultivator 22 can be indexed relative to the lines of travel of the sweeps of the remaining rows to affect a so-called "split the middle" sweep pattern, which allows for uniform ridges to be formed. The shank assembly 38 ahead of the rear two rows of sweeps take a full cut and leave alternating strips of untilled soil. The shank assembly 38 of the two rear rows till the untilled strips left by the forward sweeps. Specifically, the sweeps in the next to last row till one half of the width of the remaining untilled strips and take out the middle of the ridges left by the sweeps in the row directly in front of that row. The shank assembly 38 of the rear row till the other half of the untilled strips and fill the grooves left by the next to last row of sweeps and take out the middle of the ridge left by the sweeps of the third row, resulting in a groove behind each of the shank assembly 38 of the rear row and a ridge adjacent each groove.

Except for being of different widths, the harrow sections 26, 28, 30 can identical to one another. The following description of harrow section 30 therefore applies equally to sections 26 and 28.

Referring to FIG. 2, the harrow section 30 includes a plurality of tines 60 and tine frames 62 that support the tines 60. The tine frames 62 can support the tines 60 in longitudinally spaced, transversely extending rows, and be connected to a pair of longitudinally extending support arms 64. The tine frames 62 can be coupled to the cultivator by a pair of floating hitch assemblies or any other suitable manner that allows the tines 60 to engage the soil as the implement 20 travels across a field.

Figure 3:
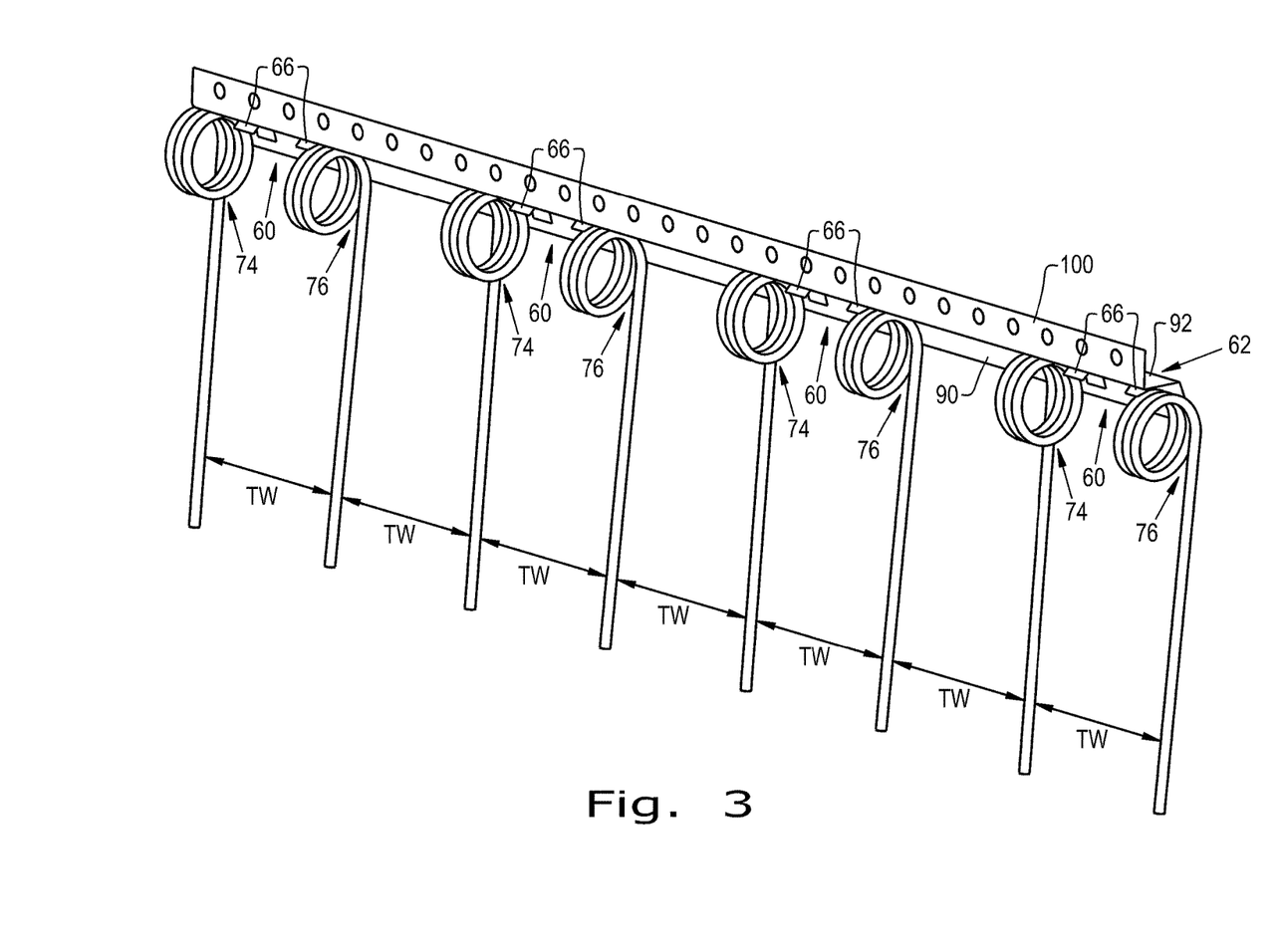
FIG. 3 is a perspective view of a tine frame and attached tines formed according to the present invention.
Figure 4:
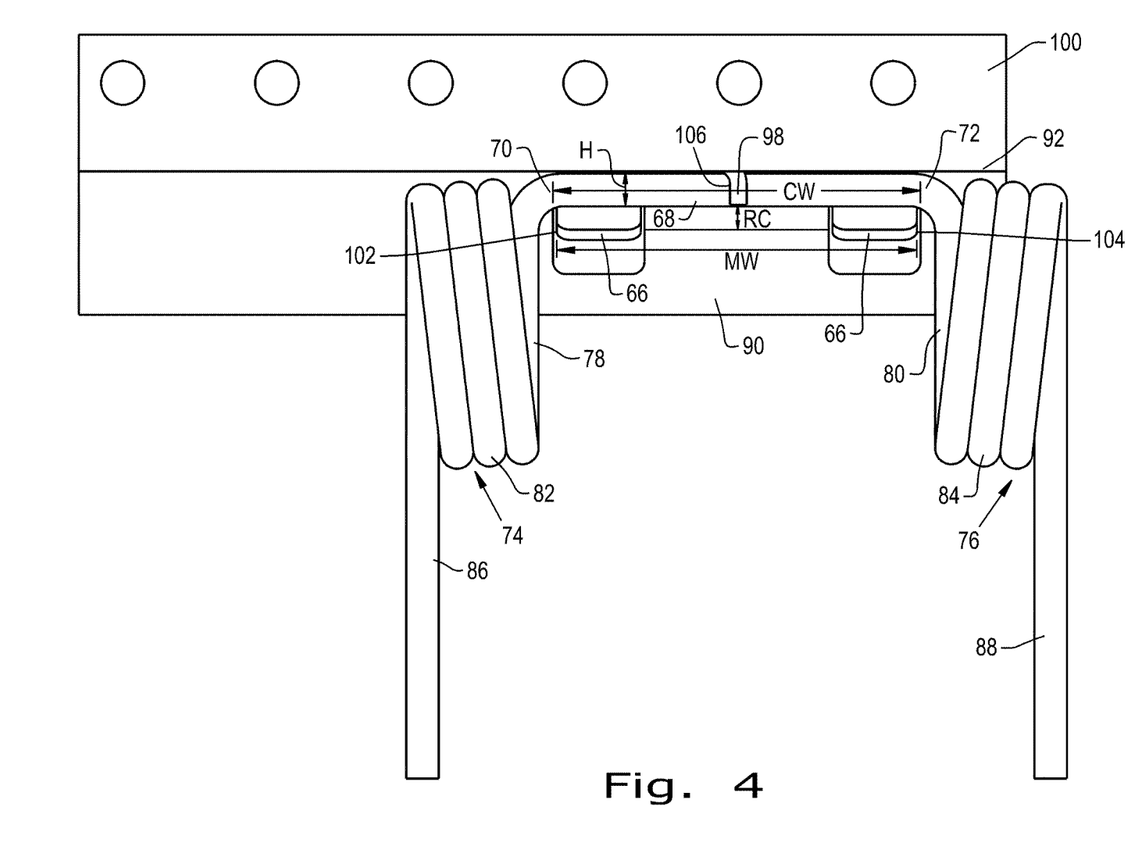
FIG. 4 is a front view of the tine frame and tines shown in FIG. 3.

Referring now to FIGS. 3-4, one of the tine frames 62 and attached tines 60 are shown to better illustrate one embodiment of the present invention. As can be seen, the shown tine frame 62 includes clamp tabs 66 that clamp the tines 60 to the tine frame 62, which will be described further herein. Each tine 60 includes a clamped portion 68 (shown in FIG. 4) that is clamped to the tine frame by one or more respective clamp tabs 66. As shown in FIG. 4, the clamped portion 68 has a pair of opposite ends 70, 72, with the tines 60 each having a vertically descending tooth 74, 76 connecting to one of the respective ends 70, 72. Each tooth 74, 76 can include a connecting portion 78, 80 which connects to the respective end 70, 72 of the clamped portion 68, a coiled portion 82, 84 connected to the connecting portion 78, 80, and a working portion 86, 88 that can contact the ground as the implement 20 is carried across a field. By pairing the teeth 74, 76 of the tines 60 to a single clamped portion 68 which is attached to the tine frame 62, the number of tines 60 that must be attached to the tine frame 62 can be reduced, which also reduces the time needed to mount all the tines 60. When attached to the tine frame 62, all of the teeth 74, 76 of the tines 60 can define an equal tooth spacing TW between adjacent teeth 74, 76 in order to symmetrically work the field as the implement 20 travels. The tines 60 can be formed from any suitable material, such as steel, in any suitable fashion.

Figure 5:
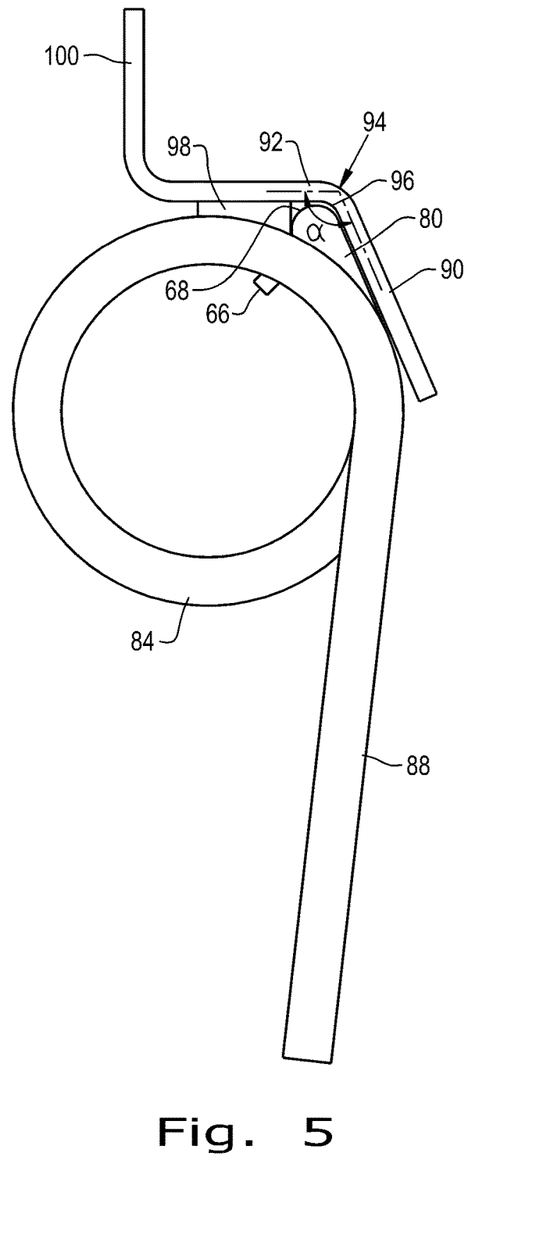
FIG. 5 is a side view of the tine frame and tines shown in FIGS. 3-4.

Referring now to FIGS. 4-5, the structure of the tine frame 62 is illustrated in better detail. As can be seen, the tine frame 62 includes a first surface 90 with the clamp tabs 66 and a second surface 92 which is angled with respect to the first surface 90 and joined with the first surface 90. As can be seen in FIG. 5, a joint region 94 formed between first surface 90 and second surface 92 can form a joining angle α which is greater than 90° and have a curved interior 96 which accommodates the shape of the clamped portion 68 of the tine 60 when, for example, the tine 60 is formed from wire. As shown, the first surface 90 has a pair of clamp tabs 66 clamping the clamped portion 68 of the tine 60 against both the first surface 90 and the second surface 92, but the clamp tabs 66 can also clamp the clamped portion 68 against a single one of the first surface 90 and second surface 92 if desired. While the clamp tabs 66 are shown as lance tabs formed in the first surface 90, the clamp tabs 66 can alternatively be formed as other types of tabs and can be, if desired, simply attached to the first surface 90 rather than formed from a portion of the first surface 90 as shown. As can be seen in FIG. 5, the second surface 92 can also include a stop 98 extending therefrom which limits the ability of the clamped portion 68 of the tine 60 to move along the second surface 92 when the tine 60 is clamped to the tine frame 62. The tine frame 62 can also include a mounting flange 100 connected to the second surface 92 which can be bolted or otherwise connected to a mount (not shown) to connect the tine frame 62 to the rest of the harrow section 30.

Referring back to FIG. 4, it can be seen that the opposite ends 70, 72 of the clamped portion 68 define a clamping width CW therebetween and the two clamp tabs 66 define a maximum distance MW between respective exterior lateral ends 102, 104 of the tabs 66 which is equal to the clamping width CW. As used herein, the lateral ends 102, 104 of the tabs 66 are "exterior" in the sense that the ends 102, 104 do not face one another. By having the maximum distance MW between the exterior lateral ends 102, 104 be equivalent to the clamping width CW, the clamp tabs 66 can limit bending of the tine 60 in the region where the connecting portions 78, 80 connect to the clamped portion 68. It can also be seen that the clamped portion 68 of the tine 60 defines a middle region 106 which is approximately equidistant from both ends 70, 72 of the clamped portion 68 and abuts against the stop 98 extending from the second surface 92.

To securely hold the clamped portion 68 of the tine 60 with the clamp tabs 66, the clamp tabs 66 and stop 98 can define a resting clearance RC which is less than a height H defined by the clamped portion 68 of the tine 60. As used herein, the "resting clearance" RC formed between the clamp tabs 66 and stop 98 is determined when the clamp tabs 66 are in a non-deformed, i.e., resting, state. When the first surface 90 is formed from a reversibly deformable material, such as steel, forming the clamp tabs 66 as lance tabs allows the tabs 66 to deform in order to accommodate the portion 68 of the tine 60 when the portion 68 is attached. By having the resting clearance RC be less than the height H of the clamped portion 68, the clamp tabs 66 must be deformed in order for the portion 68 to clear the stop 98 and be clamped to the tine frame 62. The deformation of the clamp tabs 66 can be maintained even when the portion 68 is clamped, allowing the clamp tabs 66 to press against a bottom 108 of the clamped portion 68 and firmly press the clamped portion 68 against the first surface 90 and/or second surface 92. This clamping of the clamped portion 68 by the clamp tabs 66 therefore allows the tine 60 to be attached to the tine frame 62 quickly without the need for bolting or other method of connecting the tine 60 to the tine frame 62. Further, the tine 60 can be easily removed by pulling the tine 60 away from the tine frame 62 such that the clamped portion 68 sufficiently deforms the clamp tabs 66 so the clearance between the clamp tabs 66 and the stop 98 becomes greater than or equal to the height H of the clamped portion 68. Referring again to FIG. 3, it can be seen that all of the tines 60 attached to the tine frame 62 are formed identically and all of the clamp tabs 66 clamping the tines 60 to the tine frame 62 are also formed identically. Such a configuration allows the tines 60 to be easily and quickly attached to the tine frame 62 using a similar procedure, allowing the installer to quickly attach the tines 60 to the tine frame 62 and/or replace any broken tines 60 that might be attached to the tine frame 62.

Figure 6:
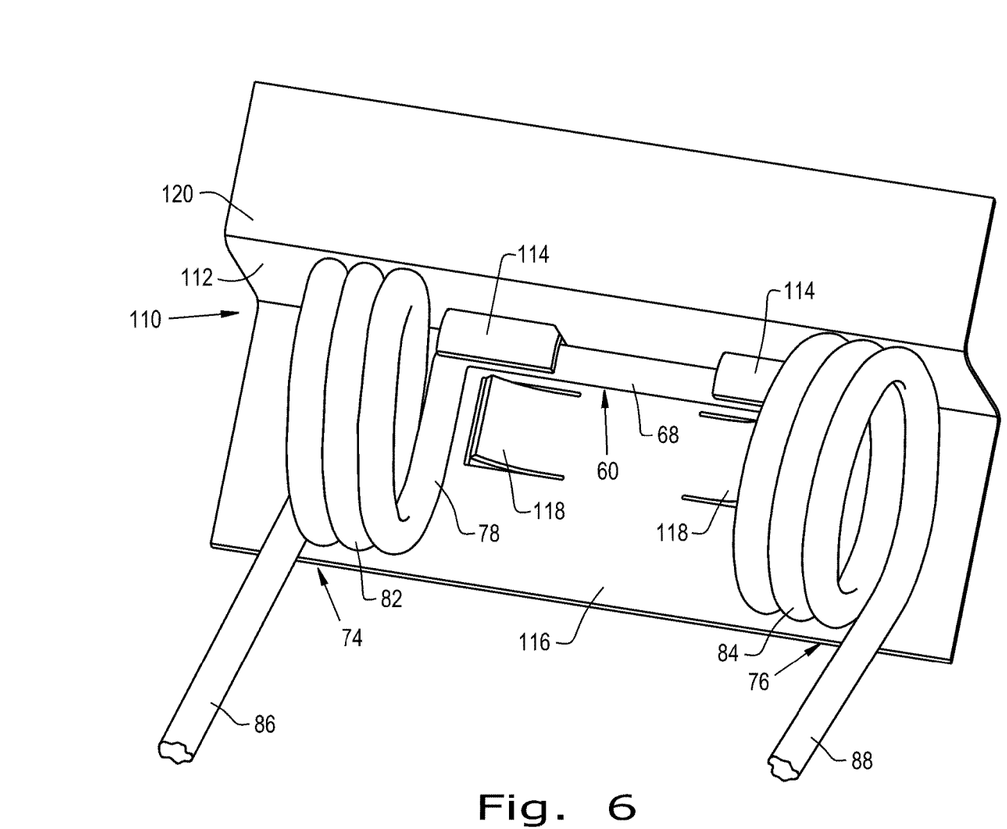
FIG. 6 is a perspective view of another embodiment of a tine frame formed according to the present invention.

Referring now to FIG. 6, another embodiment of a tine frame 110 formed according to the present invention is shown. As can be seen, the tine frame 110 includes a first surface 112 with a pair of clamp tabs 114 that connects to a second surface 116 with a pair of stops 118 extending therefrom. Unlike the tine frame 62 previously described, the first surface 112 of the tine frame 110 also connects to a mounting flange 120. Further, the stops 118 are formed as lance tabs in the second surface 116. In all other respects, however, the tine frame 110 is similar to the tine frame 62 previously described and the clamp tabs 114 clamp the clamped portion 68 of the tine 60 in a similar fashion.

Figure 7:
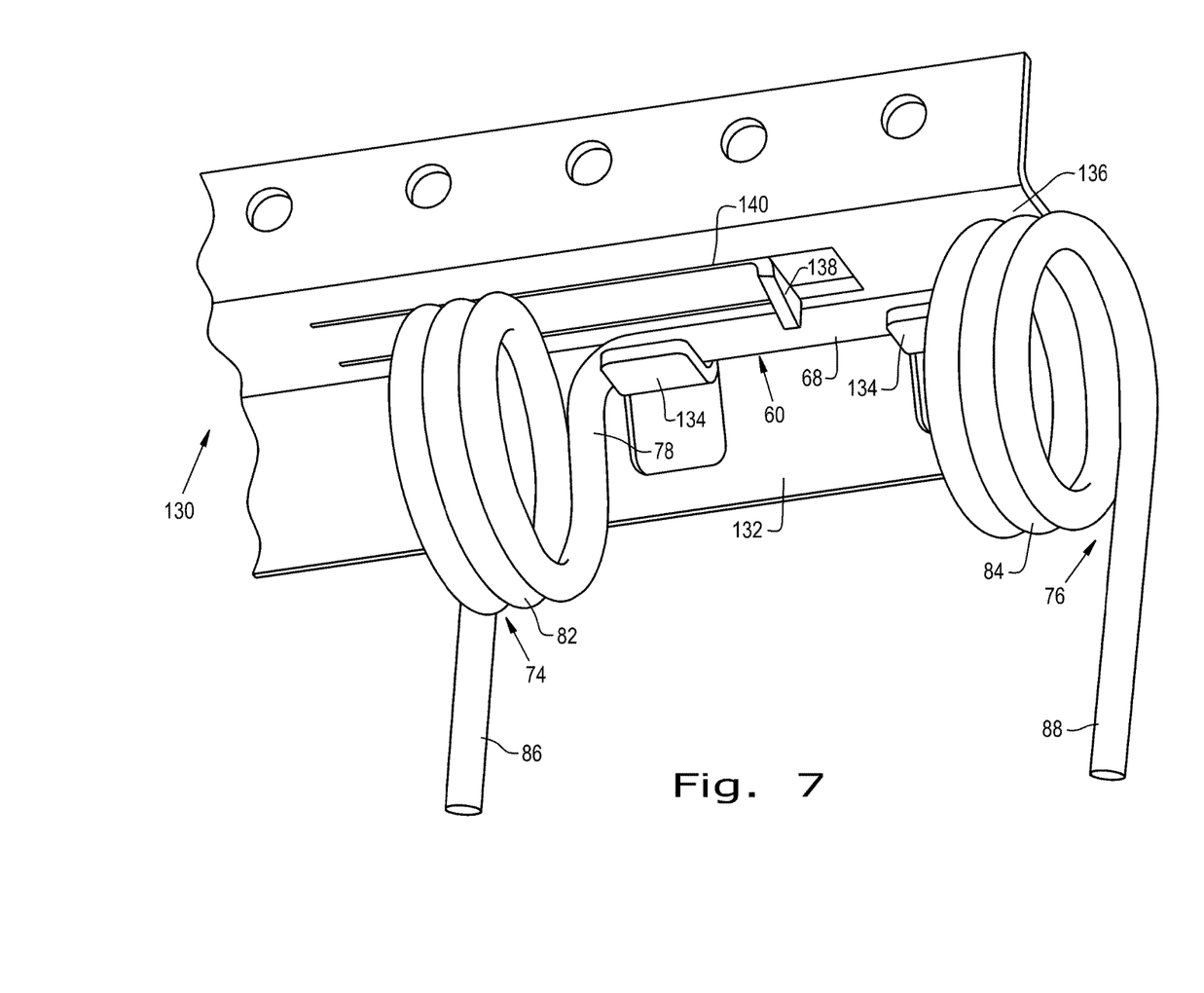
FIG. 7 is a perspective view of yet another embodiment of a tine frame formed according to the present invention.

Referring now to FIG. 7, yet another embodiment of a tine frame 130 formed according to the present invention is shown. As can be seen, the tine frame 130 includes a first surface 132 with a pair of clamp tabs 134 that connects to a second surface 136 with a stop 138 extending therefrom. Unlike the tine frame 62 previously described, the stop 138 is formed as a lance tab in the second surface 136. In all other respects, however, the tine frame 130 is similar to the tine frame 62 previously described and the clamp tabs 134 clamp the clamped portion 68 of the tine 60 in a similar fashion. The tine frame 62 has a slot 140 formed adjacent to the stop 138, which is discussed further herein.

Figure 8:
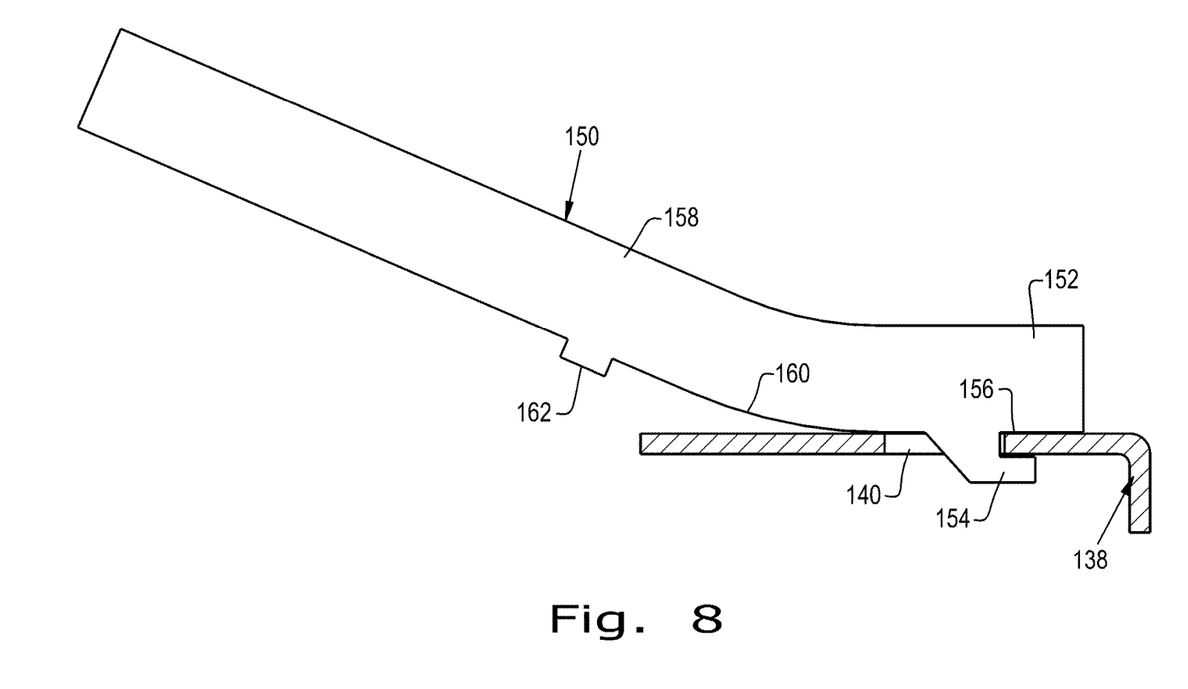
FIG. 8 is a side view of a removal tool positioned to help remove a tine from the tine frame shown in FIG. 7.

Referring now to FIG. 8, a removal tool 150 is shown inserted in the slot 140 of the tine frame 130 in order to lift the stop 138 and remove the tine 60 from the tine frame 130. As can be seen, the removal tool 150 has an insertion portion 152 with a hook 154 that inserts into the slot 140 so the material of the stop 138 rests within a groove 156 formed between the hook 154 and the material of the insertion portion 152. The insertion portion 152 connects to a lever portion 158 which can be angled with respect to the insertion portion 152 and meet along a curved portion 160. To remove the tine 60 from the tine frame 130, the lever portion 158 can be pushed downwardly to lift the stop 138 when the insertion portion 152 is positioned within the slot 140 with the material of the stop 138 resting within the groove 156, allowing the clamped portion 68 of the tine 60 to be pulled away from the tine frame 130. In this sense, the stop 138 can also be formed of a reversibly deformable material to allow the removal tool 150 to be used multiple times to insert and remove tines 60 from the tine frame 130. To prevent excessive lifting of the stop 138 by the removal tool 150, and therefore irreversible deformation, the lever portion 158 of the removal tool 150 can include a stop projection 162 which will contact a surface of the tine frame 130 when the removal tool 150 is pushed downwardly a sufficient distance, limiting the distance that the removal tool 150 can lift the stop 138. It should thus be appreciated how the clamp tabs and/or the stops formed according to the present invention can be reversibly deformable in order to attach and remove tines to a tine frame.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
   a chassis;
   a hitch connected to said chassis; and
   a harrow carried by said chassis, said harrow comprising:
      a tine frame having at least one clamp tab formed as a lance tab in said tine frame; and
      at least one tine clamped to said tine frame by said at least one clamp tab, said at least one tine including a clamped portion with a pair of opposite ends and a pair of vertically descending teeth, each of said vertically descending teeth being connected to a respective one of said opposite ends of said clamped portion.

2. The implement according to claim 1, wherein said tine frame includes two clamp tabs clamping said clamped portion of said at least one tine to said tine frame.

3. The implement according to claim 2, wherein said pair of opposite ends of said clamped portion define a clamping width therebetween which is equal to a maximum distance between said two clamp tabs.

4. The implement according to claim 1, wherein said at least one clamp tab extends from a first surface of said tine frame and said tine frame includes a second surface angled with respect to said first surface, said at least one clamp tab clamping said clamped portion of said tine against said second surface.

5. The implement according to claim 4, wherein said second surface includes a stop extending therefrom.

6. The implement according to claim 5, wherein said clamped portion of said at least one tine defines a middle region which is equidistant from said opposite ends, said middle region of said clamped portion abutting against said stop.

7. The implement according to claim 5, wherein said stop is formed as a lance tab in said second surface.

8. The implement according to claim 5, wherein said clamped portion of said at least one tine defines a height, said at least one clamp tab and said stop defining a resting clearance therebetween which is less than said height of said clamped portion.

9. The implement according to claim 5, wherein at least one of said at least one clamp tab and said stop comprises a reversibly deformable material.

10. The implement according to claim 1, wherein said at least one clamp tab supports a bottom of said at least one tine.

11. The implement according to claim 1, wherein said at least one clamp tab comprises a plurality of clamp tabs and said at least one tine comprises a plurality of tines, each of said plurality of tines being clamped to said tine frame by at least one of said clamp tabs.

12. The implement according to claim 11, wherein said vertically descending teeth of said plurality of tines define an equal tooth spacing between adjacent teeth.

13. The implement according to claim 11, wherein said plurality of clamp tabs are identical.

14. The implement according to claim 11, wherein said plurality of tines are identical.

15. An agricultural implement, comprising:
a chassis;
a hitch connected to said chassis; and
a harrow carried by said chassis, said harrow comprising:
 a tine frame having a first surface with at least one clamp tab and a second surface joined with said first surface and angled with respect to said first surface, said second surface comprising a stop extending therefrom; and
 at least one tine clamped to said first surface and said second surface by said at least one clamp tab, said at least one tine including a clamped portion and at least one vertically descending tooth connected to said clamped portion.

16. The implement according to claim 15, wherein at least one of said at least one clamp tab and said stop is formed as a lance tab.

17. The implement according to claim 15, wherein at least one of said at least one clamp tab and said stop comprises a reversibly deformable material.

* * * * *